July 11, 1961   R. A. WHITLOCK ET AL   2,991,793
LIQUID LEVEL CONTROL
Filed March 26, 1959
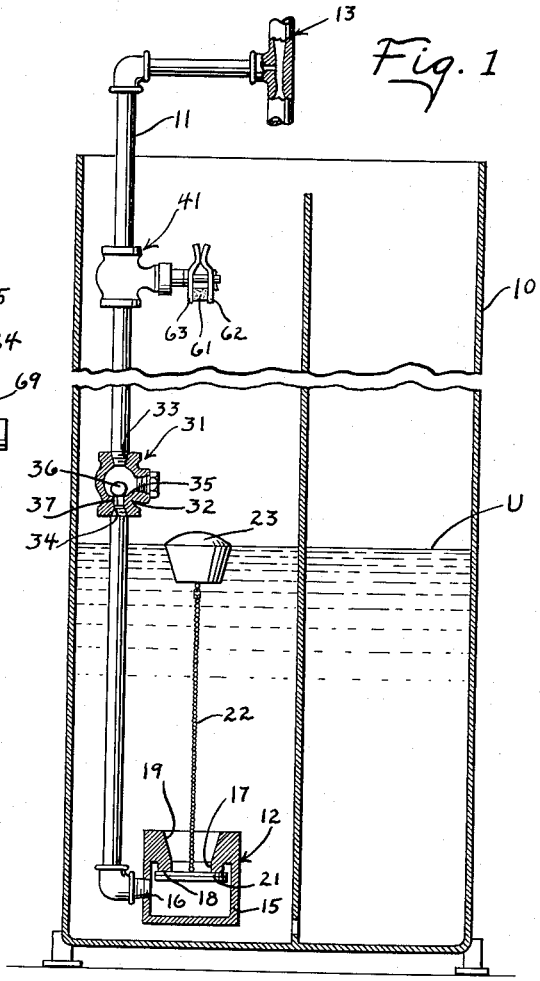
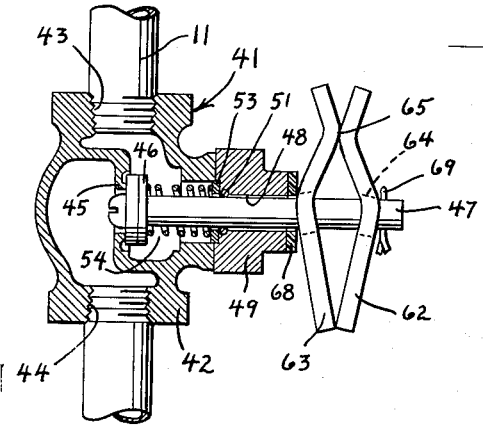
Inventor
Robert A. Whitlock
Curtis C. Jouse
By McCanna, Morsbach & Pillote
Atty's

United States Patent Office 2,991,793
Patented July 11, 1961

2,991,793
LIQUID LEVEL CONTROL
Robert A. Whitlock and Curtis C. Jouse, Rockford, Ill., assignors to AquaMatic Inc., Rockford, Ill., a corporation of Illinois
Filed Mar. 26, 1959, Ser. No. 802,256
4 Claims. (Cl. 137—67)

This invention relates to liquid level control systems and particularly to an improved safety valve for preventing overfilling of a tank.

An important object of this invention is to provide an improved liquid level control system including a safety valve for use in conjunction with a float valve in a tank to automatically shut off the supply of water to the tank in the event the float valve fails to close properly and the tank begins to overfill, which safety valve is of simple and economical construction and reliable in operation.

A more particular object of this invention is to provide a liquid level control system including a safety valve which is normally urged to its closed position and which employs a water-sensitive element to hold the safety valve open, which element has a composition which remains rigid under normal atmospheric humidity conditions and which will disintegrate upon direct contact with water to thereby permit the valve to close when the water level rises upwardly into contact with the sensitive element.

Another object of this invention is to provide a safety valve in accordance with the foregoing object and having a novel arrangement for connecting the water-sensitive element to the valve by which an ordinary poppet valve can be economically converted for use as a safety valve.

A further object of this invention is to provide a safety valve construction in which a relatively high pressure is applied to the valve member to urge it to its closed position to assure reliable operation of the valve and in which the water-sensitive element is subjected to a relatively lower pressure in opposing movement of the valve member to its closed position.

These together with various ancillary objects and advantages of this invention will be more readily appreciated as the same becomes better understood by reference to the following detailed description when taken in connection with the accompanying drawings wherein:

FIGURE 1 is a longitudinal sectional view through a tank having a float control valve therein for normally maintaining the liquid in the tank below a preselected level, and having the safety valve of the present invention applied thereto to prevent overfilling of the tank;

FIG. 2 is a longitudinal sectional view through the safety valve illustrating the latter in its normally open position; and FIG. 3 is a longitudinal sectional view through the safety valve and illustrating the same in its closed position.

Although generally adapted for use to prevent overfilling of any liquid storage tank, the safety valve of the present invention is specifically designed and adapted for use to prevent overfilling of the regenerant tank 10 of a water treatment apparatus. As is conventional, such tanks include a supply line 11 through which water is alternately introduced and withdrawn during the regeneration cycle, and a float valve 12 is provided for controlling the flow of water into and out of the tank. Commonly, the supply line 11 is connected to the throat of an ejector 13 and a valve mechanism (not shown) is provided for controlling the flows to the ejector so as to pass water in one direction through the ejector to withdraw water from the line 11, and to pass water in the other direction to the ejector to feed water to the line 11.

The float valve 12 may be of any conventional construction which is operative when the liquid in the tank reaches a preselected upper level designated U in FIG. 1, to close and terminate the flow of water into the tank 10. The float valve shown herein is of the type disclosed in the patent to Whitlock No. 2,716,422 and includes a casing 15 having an inlet 16 connected to the line 11 and an outlet passage 17 through which liquid is introduced and withdrawn from the tank. A lower valve seat 18 is formed at one end of the passage and an upper valve seat 19 is formed at the other end of the passage. A valve member 21 is disposed in the casing 15 and is connected through a flexible bead chain 22 to a float 23. As is apparent, when the liquid reaches the upper level U, the float 23 raises the valve member 21 against the lower seat 18 and blocks flow into the tank 10. When liquid is withdrawn from the line 11, the valve member 21 unseats from the lower seat due to the fluid pressure unbalance thereon, and the float 23 moves downwardly until it engages the upper seat 19 and terminates the flow of water out of the tank.

A flow restrictor 31 is commonly provided in the line 11 and, as shown herein, comprises a casing 32 having inlet and outlet passages 33 and 34 connected to the line. The outlet passage has a valve seat 35 therein and a valve member 36 for controlling the flow therethrough. The valve member 36 is adapted to unseat, during withdrawal of liquid from the line 11, and permit relatively rapid flow from the tank. A small by-pass groove or passage 37 is formed in the seat 35 to permit a restricted flow of water into the tank 10, when the valve member 36 reseats during filling of the tank. Thus, the tank is arranged to be filled slowly while water can be withdrawn from the tank at a relatively more rapid rate.

The safety valve 41 of the present invention is arranged to be connected in the line 11 and located within the tank, at a point below the top of the tank and above the upper liquid level U which is normally maintained in the tank by the float valve. The safety valve is normally open and is adapted to close in the event the float valve does not close properly and the liquid level in the tank rises above the normal upper level U. The safety valve is of the poppet type and includes a casing 42 having an inlet 43 and an outlet 44 and a valve seat 45 intermediate the inlet and outlet. During refilling of the tank, water flows from the inlet 43 past the valve seat 45 and through the outlet 44, and a valve member 46 carried by a stem 47 is mounted for movement in the direction of liquid flow through the seat 45, to a position blocking flow through the same. As shown herein, the stem 47 is slidably supported in a bore 48 in a cap 49 attached to the casing 42 and an O-ring 51 is disposed around the stem and retained in position by a washer 53, to prevent leakage between the stem and cap. A spring 54 is interposed between the valve member 46 and the washer 53 to yieldably urge the valve member to its closed position shown in FIG. 3. As is apparent, when the valve is in its closed position, full line pressure is applied to the valve member to aid in maintaining the same in its closed position.

The safety valve member 46 is normally held in its open position by a water-sensitive element 61 having a composition such that it remains rigid under the atmospheric humidity conditions in the tank above the water level therein, and which disintegrates or becomes non-rigid when water contacts the same. As used herein, the term disintegrate is intended to include dissolving, mechanical or chemical breaking-up, or merely marked softening of the element such that it no longer remains sufficiently rigid to hold the valve member in its open position. While any suitable water-sensitive element may be used, it has been found that the conventional sugar cubes utilized for sweetening drinks advantageously can be employed. Such cubes are relatively rigid; will withstand the normal humidity conditions encounted in the regenerant tank above the liquid level, and dissolve and crumble rapidly upon direct contact with liquid. Moreover, such cubes are readily available to assure the homeowner a convenient source of supply for replacement.

The water-sensitive element 61 is connected to the stem 47 to prevent inward movement of the stem and valve members by means of levers 62 and 63. The levers may conveniently be identical in construction and each include an elongated opening 64 intermediate the ends thereof for loosely receiving the outer end portion of the valve stem 47. One end portion of each of the levers 62 and 63 are angulated to form a fulcrum 65 to pivotally interconnect one end of the levers. The other end portions of the levers define jaws for clamping the element 61 therebetween and, as shown herein, the jaws are shaped to hold a cube therebetween and extend parallel to each other when the cube is interposed between the jaws. One of the levers 63 is adapted to about against the cap 49 on the valve casing and, preferably, a plastic disk 68 is interposed between the cap and the lever to prevent bonding of the lever to the casing by corrosion. A cotter pin 69 extends through the outer end of the stem 47 and engages the other lever 62 so that the pressure of the spring is applied to the outer lever and transmitted thereby to the water-sensitive element 61. The water-sensitive element thus prevents movement of the valve member to its closed position until it is contacted directly by water, at which time it dissolves or disintegrates and allows the valve member to close under the bias of the spring 53.

In order to assure reliable operation, the spring 53 is arranged to apply a relatively high pressure or force to urge the valve member to its closed position, to overcome friction and any corrosion around the stem. It will be noted, however, that the water-sensitive element 61 is located relatively further from the fulcrum 65 of the levers, than the connection of the stem 47 to the lever, so that the compressive force applied to the water-sensitive element is proportionately less than the pressure which urges the valve member to its closed position. This enables the use of relatively more frangible water-sensitive elements, such as the aforementioned sugar cube. Moreover, this particular construction enables the conventional poppet valve to be readily adapted for use as a safety valve, since it is only necessary to slip the levers 62 and 63 onto the stem 47, insert the cotter pin 69 to retain the levers thereon.

We claim:

1. A safety valve for use in a tank to prevent overfilling comprising, a valve casing having an inlet and an outlet and a port between said inlet and outlet, a valve member in said casing including a stem slidably extending through said casing, means engaging said casing defining a first fulcrum laterally offset to one side of said stem and a first jaw laterally offset to the other side of said stem, a lever having means intermediate the ends thereof for swingably supporting the lever on said stem, said lever having means on one end thereof defining a second fulcrum engageable with said first fulcrum and pivotally supporting said lever, a water-sensitive element having a composition which remains rigid under normal atmospheric humidity conditions and disintegrates on contact with water, said lever having means on the other end thereof defining a jaw for clamping said element to said first jaw, and spring means yieldably urging said valve member to its closed position.

2. The combination of claim 1 wherein said means for pivotally supporting the lever on the stem includes an opening intermediate the ends of the lever loosely receiving said stem, and means on the stem pivotally engaging the lever at the side remote from the valve.

3. A safety valve for use in a tank to prevent overfilling comprising a valve casing, a valve member in said casing including a stem slidably extending through said casing, a pair of levers each having openings intermediate the ends thereof for loosely receiving said stem, said levers having means on one end thereof defining a fulcrum for pivotally interconnecting said levers, a water-sensitive element having a composition which remains rigid under normal atmospheric humidity conditions and which disintegrates on contact with water, said levers having means on the other ends thereof defining jaws for clamping said element therebetween, spring means yieldably urging said valve member to its closed position, and means connecting said stem to one of said levers to apply the spring pressure to said levers and to said element whereby the element prevents closing of the valve member until contacted by water.

4. The combination of claim 3 wherein the water-sensitive element is a sugar cube.

References Cited in the file of this patent

UNITED STATES PATENTS

| | | |
|---|---|---|
| 1,286,485 | Addicks | Dec. 2, 1918 |
| 1,993,666 | Hornell | Mar. 5, 1935 |
| 2,034,370 | Beckwith | Mar. 17, 1936 |
| 2,716,422 | Whitlock | Aug. 30, 1955 |
| 2,768,027 | Nelson | Oct. 23, 1956 |
| 2,827,915 | Mitchell | Mar. 25, 1958 |
| 2,935,196 | Miller | May 3, 1960 |